(12) United States Patent
Engle et al.

(10) Patent No.: US 11,068,921 B1
(45) Date of Patent: Jul. 20, 2021

(54) AUTOMATED TESTING OF MULTIPLE ON-LINE COUPONS

(71) Applicant: Capital One Services, LLC, McLean, VA (US)

(72) Inventors: Ryan Engle, Austin, TX (US); Jonathan Coon, Austin, TX (US); Robert Duke, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 268 days.

(21) Appl. No.: 15/677,951

(22) Filed: Aug. 15, 2017

Related U.S. Application Data

(63) Continuation-in-part of application No. 14/933,173, filed on Nov. 5, 2015, now abandoned.

(60) Provisional application No. 62/376,243, filed on Aug. 17, 2016, provisional application No. 62/462,521, filed on Feb. 23, 2017, provisional application No. 62/075,903, filed on Nov. 6, 2014, provisional application No. 62/174,846, filed on Jun. 12, 2015, provisional application No. 62/238,565, filed on Oct. 7, 2015, provisional application No. 62/238,574, filed on Oct. 7, 2015.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0222* (2013.01); *G06Q 30/0239* (2013.01); *G06Q 30/0633* (2013.01)

(58) Field of Classification Search
CPC .............................................. G06G 30/0633
See application file for complete search history.

(56) References Cited

U.S. PATENT DOCUMENTS

| 8,065,195 B2 | 11/2011 | Tarvydas et al. |
| 8,577,749 B2 | 11/2013 | Aliabadi et al. |
| 8,600,931 B1 | 12/2013 | Wehrle et al. |
| 8,775,275 B1 | 7/2014 | Pope |
| 8,881,303 B2 | 11/2014 | Liu et al. |
| RE45,371 E | 2/2015 | Simons |

(Continued)

FOREIGN PATENT DOCUMENTS

| WO | 2008121737 | 10/2008 |
| WO | 2009061399 | 5/2009 |

OTHER PUBLICATIONS

Schultz, "NBA Data Scraping—Game Data", 2015.
Reda, "Web Scraping 201: Finding the API", 2015.
Moore, "Nylon Calculus 101: Data Scraping with Python", 2015.

*Primary Examiner* — Alvin L Brown
(74) *Attorney, Agent, or Firm* — Bookoff McAndrews, PLLC

(57) ABSTRACT

Multiple on-line coupons are automatically tested on items of interest to a customer, without requiring the customer to perform any action or to look for such coupons in various sources. Such testing can be automatically initiated and performed on items within the customer's shopping cart. Alternatively or additionally, testing can be automatically initiated and performed while the customer is browsing a page for an item on an e-commerce website, before the customer has even placed items in his or her shopping cart. The best coupon or coupons are then presented to the customer, or automatically applied to provide the customer with the appropriate discounts.

39 Claims, 10 Drawing Sheets

(56) References Cited

U.S. PATENT DOCUMENTS

| | | |
|---|---|---|
| 9,189,811 B1 | 11/2015 | Bhosle et al. |
| 9,626,688 B2 | 4/2017 | King |
| 9,639,853 B2 | 5/2017 | Shiffert et al. |
| 9,766,922 B2 | 9/2017 | Amershi et al. |
| 9,798,528 B2 | 10/2017 | Gao et al. |
| 9,892,099 B2 | 2/2018 | Cao |
| 9,953,335 B2 | 4/2018 | Shiffert et al. |
| 9,965,769 B1 | 5/2018 | Shiffert et al. |
| 2002/0087883 A1 | 7/2002 | Wohlgemuth et al. |
| 2005/0165789 A1 | 7/2005 | Minton et al. |
| 2006/0242266 A1 | 10/2006 | Keezer et al. |
| 2007/0180380 A1 | 8/2007 | Khavari et al. |
| 2008/0005079 A1 | 1/2008 | Flake et al. |
| 2008/0098300 A1 | 4/2008 | Corrales et al. |
| 2008/0189190 A1 | 8/2008 | Ferber |
| 2009/0182643 A1 | 7/2009 | Holstein et al. |
| 2009/0313352 A1 | 12/2009 | Dupont |
| 2010/0121810 A1 | 5/2010 | Bromenshenkel et al. |
| 2010/0241518 A1 | 9/2010 | McCann |
| 2010/0312632 A1* | 12/2010 | Cervenka ............... G06Q 30/02 705/14.38 |
| 2011/0088036 A1 | 4/2011 | Patanella |
| 2011/0136516 A1 | 6/2011 | Ellis |
| 2012/0011431 A1 | 1/2012 | Mao |
| 2012/0198342 A1 | 8/2012 | Mahmud |
| 2012/0265637 A1 | 10/2012 | Moeggenberg |
| 2013/0151381 A1 | 6/2013 | Klein |
| 2013/0191723 A1 | 7/2013 | Pappas et al. |
| 2014/0052517 A1* | 2/2014 | Munjal ............... G06Q 30/0207 705/14.16 |
| 2014/0100991 A1 | 4/2014 | Lenahan et al. |
| 2014/0229258 A1 | 8/2014 | Seriani |
| 2014/0229335 A1 | 8/2014 | Chen |
| 2014/0244429 A1 | 8/2014 | Clayton et al. |
| 2014/0281918 A1 | 9/2014 | Wei et al. |
| 2015/0100688 A1* | 4/2015 | Richardson ............... G06N 5/04 709/224 |
| 2015/0142543 A1* | 5/2015 | Lellouche .......... G06Q 30/0222 705/14.23 |
| 2015/0235304 A1* | 8/2015 | Vincent ............... G06Q 30/0641 705/14.23 |
| 2016/0063595 A1 | 3/2016 | Oral et al. |
| 2016/0110767 A1* | 4/2016 | Bax .................... G06Q 30/0256 705/14.54 |
| 2016/0191351 A1 | 6/2016 | Smith et al. |

\* cited by examiner

AUTOMATED TESTING OF MULTIPLE ON-LINE COUPONS

CROSS-REFERENCE TO RELATED APPLICATIONS

The present application claims the benefit of U.S. Provisional Application Ser. No. 62/376,243 for "Automated Testing of Multiple On-Line Coupons", filed Aug. 17, 2016, which is incorporated by reference herein in its entirety.

The present application further claims the benefit of U.S. Provisional Application Ser. No. 62/462,521 for "Product-Based Simultaneous Coupon Testing", filed Feb. 23, 2017, which is incorporated by reference herein in its entirety.

The present application claims priority as a continuation-in-part of U.S. Utility application Ser. No. 14/933,173 for "Universal Electronic Shopping Cart," filed Nov. 5, 2015, the disclosure of which is incorporated herein by reference.

U.S. Utility application Ser. No. 14/933,173 claims the benefit of U.S. Provisional Application Ser. No. 62/075,903 for "Universal E-Shopping Cart", filed Nov. 6, 2014, which is incorporated by reference herein in its entirety.

U.S. Utility application Ser. No. 14/933,173 further claims the benefit of U.S. Provisional Application Ser. No. 62/174,846 for "Universal E-Shopping Cart Enhancements", filed Jun. 12, 2015, which is incorporated by reference herein in its entirety.

U.S. Utility application Ser. No. 14/933,173 further claims the benefit of U.S. Provisional Application Ser. No. 62/238,565 for "Browserless Extraction of Data from Web Pages", filed Oct. 7, 2015, which is incorporated by reference herein in its entirety.

U.S. Utility application Ser. No. 14/933,173 further claims the benefit of U.S. Provisional Application Ser. No. 62/238,574 for "Automated Browserless Sequential Site Navigation", filed Oct. 7, 2015, which is incorporated by reference herein in its entirety.

TECHNICAL FIELD

The present document relates to electronic commerce, and more particularly to techniques for automatically testing multiple on-line coupons.

DESCRIPTION OF THE RELATED ART

Online shoppers are often interested in finding coupon codes and promotional codes that will maximize their savings on online purchases. Such coupon codes can typically be found at a number of different websites and from a number of different sources, causing diligent shoppers to have to search for such coupons in many places. Often, some coupons may be expired or invalid, or may have restrictions preventing their use for a particular purchase. Seeking out coupons from various sources, and testing such coupons on a particular order, can be cumbersome and unreliable. As a result, many customers fail to obtain the best prices on their purchased items.

SUMMARY

According to various embodiments, multiple on-line coupons are automatically tested on items of interest to a customer, without requiring the customer to perform any action or to look for such coupons in various sources. Such testing can be automatically initiated and performed on items within the customer's shopping cart. Alternatively or additionally, testing can be automatically initiated and performed while the customer is browsing a page for an item on an e-commerce website, before the customer has even placed items in his or her shopping cart.

Multiple network requests are automatically run, either sequentially or in parallel, to determine which coupons may work and which may provide the largest discount for items the customer may be considering purchasing. The best coupon or coupons are then presented to the customer, or automatically applied to provide the customer with the appropriate discounts.

The described techniques can be used in connection with a universal electronic shopping cart, as described in the above-referenced U.S. Utility application Ser. No. 14/933,173. Alternatively, the described techniques can be implemented in other contexts.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the system can be implemented on any electronic device or devices equipped to receive, store, and present information. Such electronic devices may be, for example, desktop computers, laptop computers, smartphones, tablet computers, smart watches, wearable devices, or the like.

Although the system is primarily described herein in connection with an implementation in a client/server context wherein the client is a computer, one skilled in the art will recognize that the techniques described herein can be implemented in other contexts, and indeed in any suitable device capable of receiving and/or processing customer input, and/or communicating with other components over an electronic network. Accordingly, the following description is intended to illustrate various embodiments by way of example, rather than to limit scope.

Figure 1:
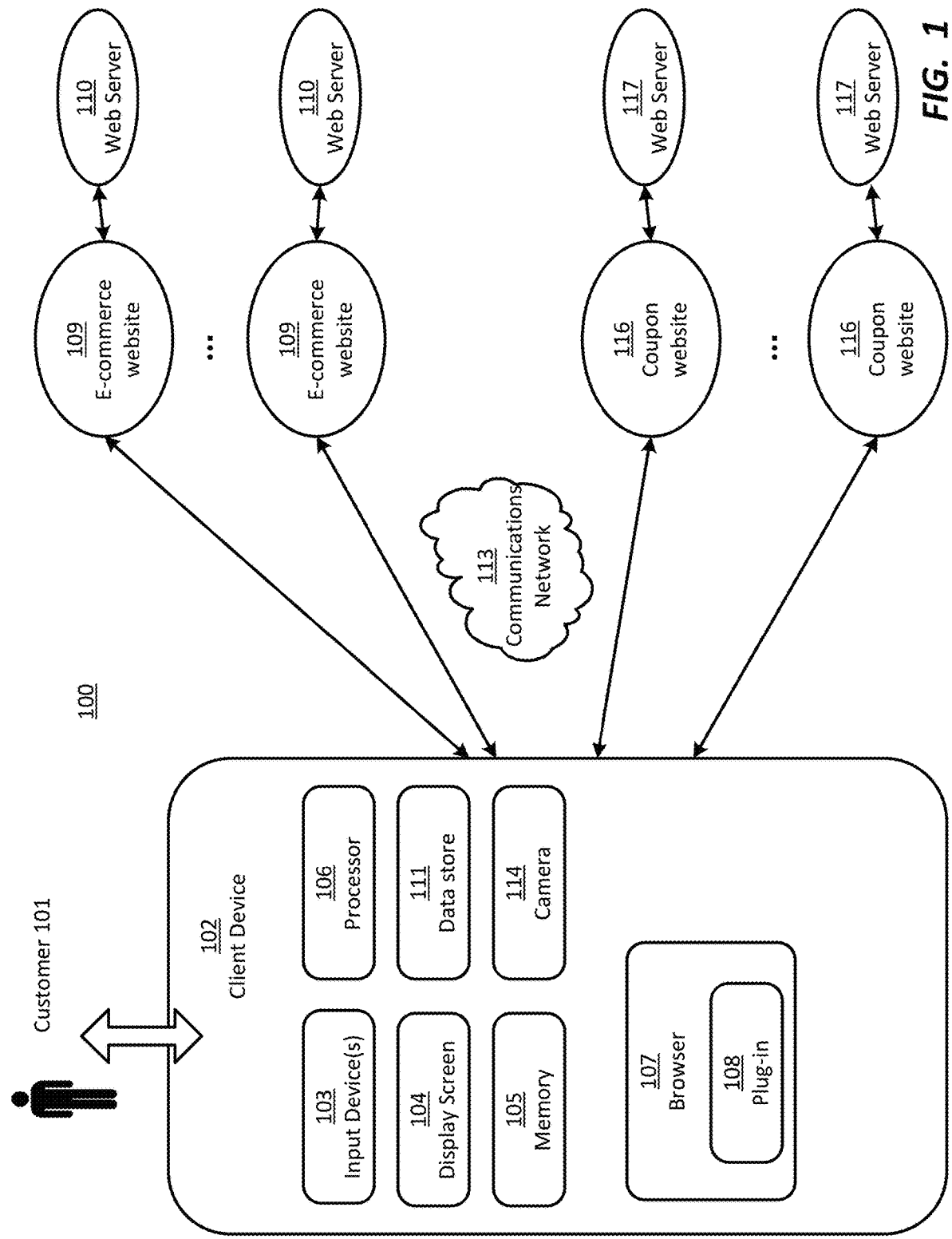
FIG. 1 is a block diagram depicting a system for automated testing of multiple on-line coupons according to one embodiment.

Referring now to FIG. 1, there is shown a block diagram depicting a system 100 for automated testing of multiple on-line coupons according to one embodiment. As shown in FIG. 1, in at least one embodiment, the system is implemented in a client/server environment wherein a server 110 receives and responds to requests from client device 102.

Client device 102 may be any electronic device equipped to receive, store, and/or present information, and to receive customer input in connect with such information, such as a desktop computer, laptop computer, personal digital assistant (PDA), cellular telephone, smartphone, music player, handheld computer, tablet computer, kiosk, game system, smart watch, wearable device, or the like. In at least one embodiment, client device 102 has a number of hardware components well known to those skilled in the art. Input device(s) 103 can be any element or elements capable of receiving input from customer 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Processor 106 can be a conventional microprocessor for performing operations on data under the direction of software, according to well-known techniques. Memory 105 can be random-access memory, having a structure and architecture as are known in the art, for use by processor 106 in the course of running software.

Browser 107 is an example of a software application that can be used by customer 101 to access and interact with websites over communications network 113. In at least one embodiment, customer 101 uses browser 107 to view and interact with e-commerce websites 109 operated by web servers 110. Such interaction can include, for example, clicking on links to view items, placing items in a shopping cart, and/or the like. In other embodiments, any suitable app (software application) or other component can be used in place of browser 107. In at least one embodiment, as described in more detail below, plug-in 108 automatically accesses coupon sources such as coupon websites 116, operated by web servers 117, to search for and test coupons for applicability to products of interest to customer 101. In other embodiments, plug-in 108 can be omitted, and the functionality described herein and associated with plug-in 108 can instead be performed by browser 107 itself, or any app (software application) or other component of client device 102.

Display screen 104 can be any element that graphically displays information such as items presented by browser 107, user interface elements, and/or the like. Such output may include, for example, descriptions and images depicting items that customer 101 may be interested in purchasing, indications of coupons and discounts, navigational elements, search results, graphical elements, prompts, windows, buttons, forms, and/or the like. In at least one embodiment where only some of the desired output is presented at a time, a dynamic control, such as a scrolling mechanism, may be available via input device 103 to change which information is currently displayed, and/or to alter the manner in which the information is displayed.

In at least one embodiment, the information displayed on display screen 104 may include data in text and/or graphical form.

Data store 111 can be any magnetic, optical, or electronic storage device for data in digital form; examples include flash memory, magnetic hard drive, CD-ROM, DVD-ROM, thumbdrive, or the like. Data store 111 may be fixed or removable.

In at least one embodiment, device 102 can include additional components. For example, a camera 114 can be included, as is well known for devices such as smartphones.

Additional input mechanisms, sensors, and/or devices can also be included in device 102, such as a speaker (for voice commands), accelerometer (to detect shaking and changes in position or orientation), GPS sensor (to detect location), and/or the like.

As mentioned above, FIG. 1 depicts an example of a system implementation in a client/server environment. An example of such a client/server environment is a web-based implementation, wherein client device 102 runs browser 107 that provides a user interface for interacting with e-commerce web pages 109 and/or other web-based resources, and wherein plug-in 108 obtains coupon information from coupon websites 116 and/or other sources. Information, images, and/or text from e-commerce websites 109 can be presented as part of such web pages and/or other web-based resources, using known protocols and languages such as Hypertext Markup Language (HTML), Java, JavaScript, and the like. Alternatively, such information, images, and/or text from e-commerce websites 109 can be presented in a software application (app) or other component running on client device 102.

In at least one embodiment, plug-in 108 or other software application runs in the background no matter what browser or application customer 101 is running. The background application can thereby see all traffic, and in particular can alert customer 101 to savings, and/or can automatically present and/or apply coupons to items of interest to customer 101.

Any suitable type of communications network 113, such as the Internet, can be used as the mechanism for transmitting data among components such as client device 102, server 110, e-commerce websites 109, coupon websites 116, and servers 110, 117, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications network 113 can be wired or wireless, or any combination thereof. Communications across network 113 can be encrypted or unencrypted. In at least one embodiment, client device 102 transmits requests for data via communications network 113, and receives responses from servers 110, 117 and/or websites 109, 116 containing the requested data.

In at least one embodiment, some components of system 100 can be implemented as software written in any suitable computer programming language. Alternatively, such components may be implemented and/or embedded in hardware.

Method

The described techniques can be used in connection with a universal electronic shopping cart, as described in above-referenced U.S. Utility application Ser. No. 14/933,173. Alternatively, the described techniques can be implemented in other contexts.

Testing Coupons for Products in Shopping Cart

Figure 2:
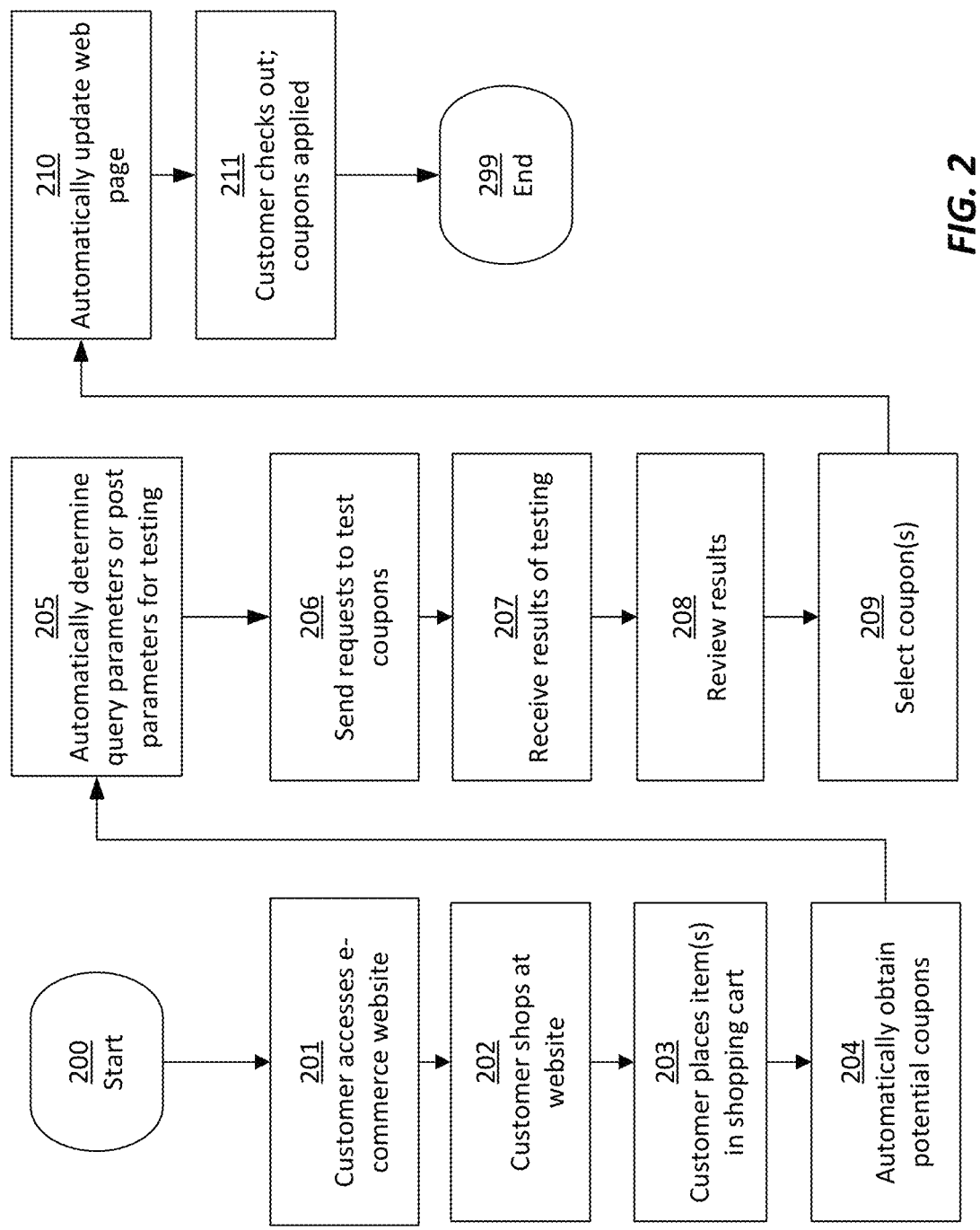
FIG. 2 is a flowchart depicting a method for automated testing of multiple on-line coupons on items in a shopping cart, according to one embodiment.

Referring now to FIG. 2, there is shown a flowchart depicting a method for automated testing of multiple on-line coupons on items in a shopping cart, according to one embodiment. Although described herein in terms of tangible goods, the system and method can be implemented for any type of online purchases, including for example services, travel, event tickets, media and entertainment content, and/ or the like.

In at least one embodiment, the described method is performed in connection with e-commerce shopping. Customer 101 places items into an electronic shopping cart, which may be a cart for an e-commerce website 109 or may be a universal shopping cart as described in the above-referenced U.S. Utility Application. Once the items have been placed in the cart, customer 101 can indicate that he or she wishes to check out, according to known techniques. In at least one embodiment, the method described below is automatically performed once customer 101 is at the checkout page. Alternatively, these steps can be performed at any other suitable time, such as for example when customer 101 adds an item to his or her shopping cart, or when he or she browses for an item. The described steps can be performed automatically, without customer 101 activating the method or taking any particular action, or they can be performed in response to customer 101 action such as hitting a button to initiate a search for applicable coupons.

In at least one embodiment, the method depicted in FIG. 2 can be performed using the architecture depicted in FIG. 1. However, one skilled in the art will recognize that the method can be performed using other architectures and arrangements.

The method begins 200. Customer 101 accesses 201 an e-commerce website 109, for example via browser 107 or via an app running on device 102. Customer 101 shops 202 normally at website 109, and places 203 items in a shopping cart.

Once at least one item is in customer's 101 shopping cart, plug-in 108 (or some other component) begins automatically testing for coupons that may be applied to the item(s). First, plug-in 108 automatically obtains 204 potential coupons from coupon websites 116 run by web servers 117, based on the item(s) in the shopping cart. In at least one embodiment, this is done by selecting coupons applicable to the e-commerce website 109 being accessed, and running those coupons through a scoring algorithm that considers the last time the coupon was successful, the success rate, the number of attempts. The algorithm takes into account what specific items are in customer's 101 shopping cart, based on any or all of specific item SKU, brand, model, the seller of the item, and/or the price of the item. In at least one embodiment, a model is applied that takes into consideration which coupons work with which items and thereby predicts whether a coupon will work for a particular item.

Plug-in 108 then automatically determines 205 necessary query parameters or post parameters to test each individual potential coupon for the e-commerce website 109 being accessed. The query parameters are then used to send 206 requests to web server 110 for the e-commerce website 109 at which customer 101 is shopping, so as to test each potential coupon. In at least one embodiment, this includes repeatedly and automatically rewriting a network request to web server 110 to test each specific coupon, with a coupon parameter being swapped out to match the particular coupon being tested. In at least one embodiment, multiple coupon requests are run sequentially. Alternatively, they can be run in parallel with one another.

Web server 110 responds 207 with an indicator of validity or invalidity for each tested coupon, and, for each valid coupon, an indicator of how much would be saved by using the coupon. Once such responses are received, plug-in 108 automatically reviews 208 the responses to determine which coupons worked and how much discount is available using each coupon. In some cases, multiple coupons may apply; accordingly, plug-in 108 can be configured to automatically test various combinations of coupons in parallel. Based on this analysis, plug-in 108 selects 209 a coupon or combination of coupons.

The web page from website 109 is then automatically updated 210, for example, by performing a refresh or by running a JavaScript command to cause browser 107 to redraw the webpage to indicate any coupon or coupons that worked. In at least one embodiment, the working coupon(s) is/are automatically applied. Customer 101 can then check out 211 and thereby purchase the item(s) using the applied coupon(s). Alternatively, customer 101 can perform other actions, such as deleting or modifying automatically selected coupons, removing or adding to items in the cart, canceling the transaction, and/or the like. In at least one embodiment, the working coupon(s) is/are automatically applied and the purchase is automatically completed, without the need for customer 101 to manually check out.

In at least one embodiment, the described steps are performed with respect to a plurality of items in customer's 101 shopping cart. By considering the plurality of items, rather than individual items separately, the system is able to take into account, for example, minimum purchase requirements for coupons and/or other factors that may affect validity or applicability of coupons to the items of interest to customer 101.

In at least one embodiment, the system operates in a manner that does not require any intervention by customer 101, and does not require that customer 101 know coupon codes, URL's for coupon websites, or any other information about potential coupons. In this manner, the system runs behind the scenes, via plug-in 108 (or other component) and using network requests, so as to automatically seek out and apply valid, working coupons without interfering with customer's 101 behavior, and without interfering with display of the e-commerce web page as coupons are being tested.

In at least one embodiment, as described above, the system can be implemented using client-side plug-in 108. Alternatively, it can be implemented using a browser 107 extension, or native functionality of client device 102. Alternatively, it can be implemented server-side, for example by passing customer's 101 cookie to a server and running requests without the use of browser 107.

Figure 4:
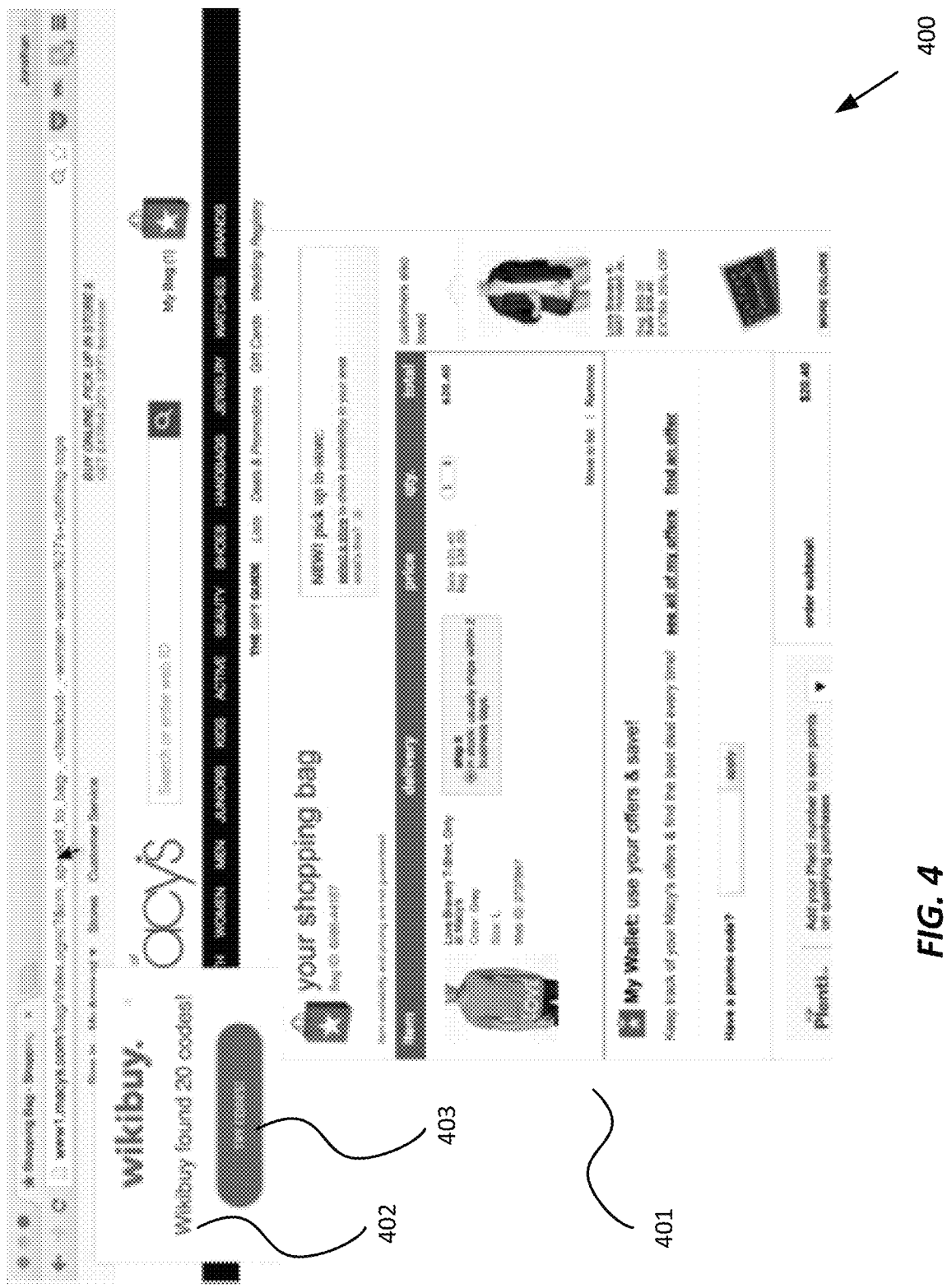
FIGS. 4 through 6 are screen shots depicting examples of a user interface for automated testing of multiple on-line coupons on items in a shopping cart, according to one embodiment.

Referring now to FIG. 4, there is shown an example of a screen shot 400 wherein customer 101 has placed items in a shopping cart 401, and client-side plug-in 108 indicates, via notification 402, that 20 coupon codes have been found. In this embodiment, button 403 is presented, to allow customer 101 to try the codes. Alternatively, plug-in 108 can test or apply codes automatically without requiring customer 101 action.

Figure 5:
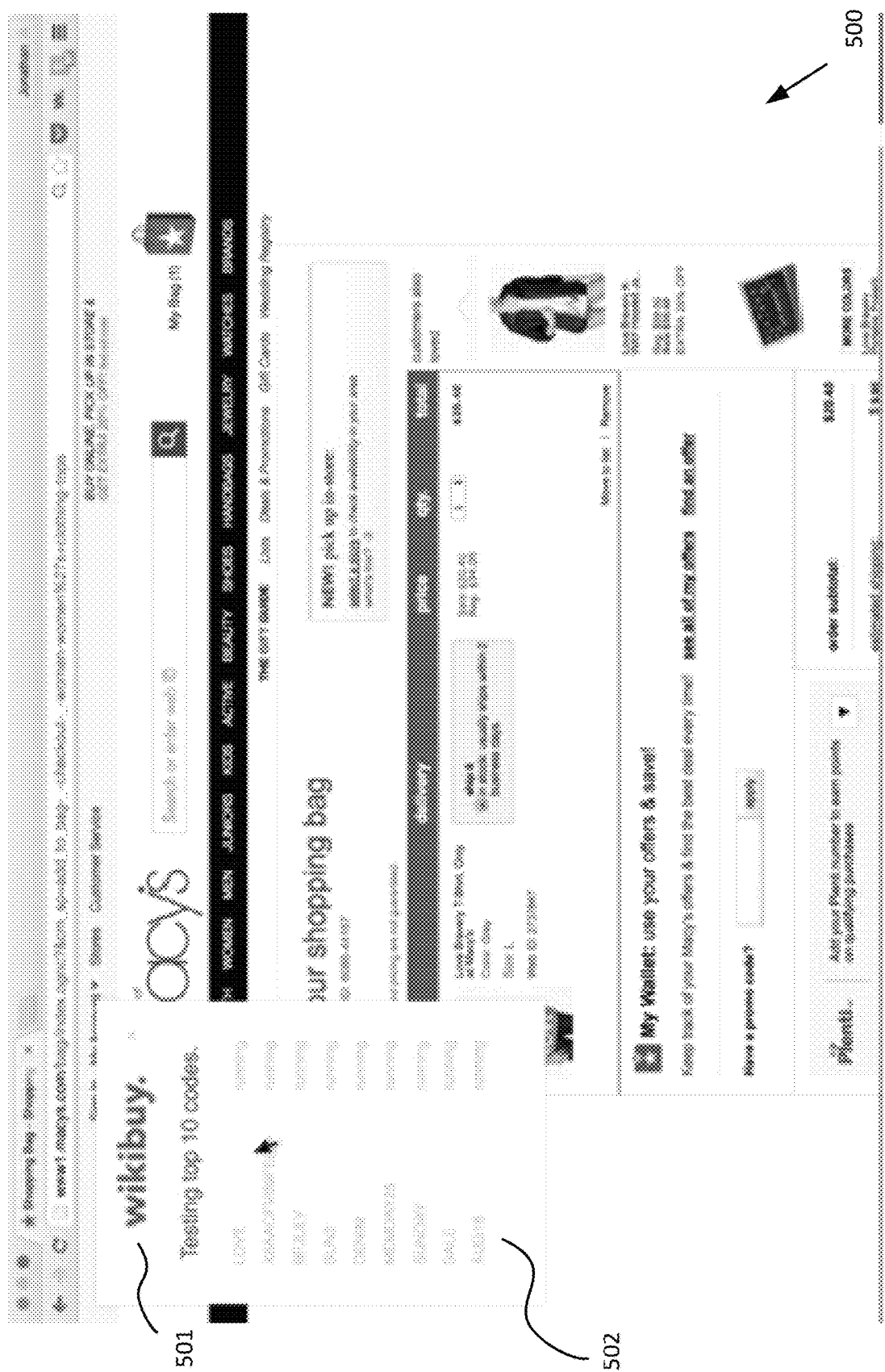

Referring now to FIG. 5, there is shown an example of a screen shot 500 wherein the system is in the process of testing a number of coupon codes. Notification 501 indicates the current progress in testing coupon codes. In at least one embodiment, plug-in 108 causes browser 107 to display a list of coupon codes 502 being tested.

Figure 6:
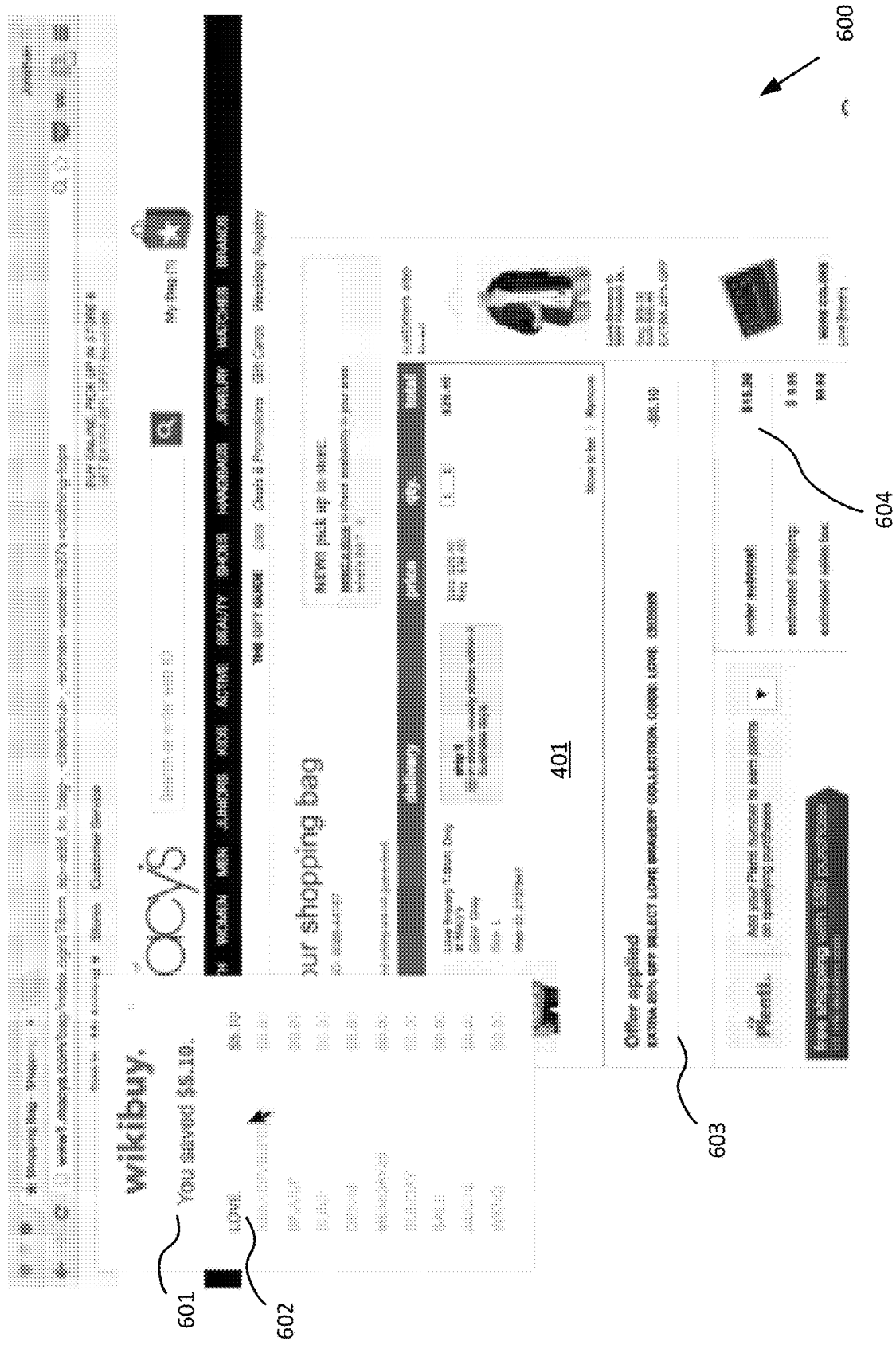

Referring now to FIG. 6, there is shown an example of a screen shot 600 wherein a number of coupon codes have been tested, and the system has identified the functioning coupon code 602 that offers the best discount, as indicated in notification 601. In at least one embodiment, the plugin highlights that coupon code 602 and applies it automatically to the item(s) in cart 401. Cart 401 includes an indication 603 of the particulars of the applied coupon. Order subtotal 604 is updated to reflect application of the coupon.

The Figures depict examples only; in other embodiments, other layouts and displays can be used. For example, the system can test and identify coupon codes without necessarily indicating that such operations are taking place; in other words, the system can operate in a manner that is essentially invisible to customer 101, while still automatically identifying and applying the coupon code that offers the best discount.

Testing Coupons for Products During Browsing

Figure 3:
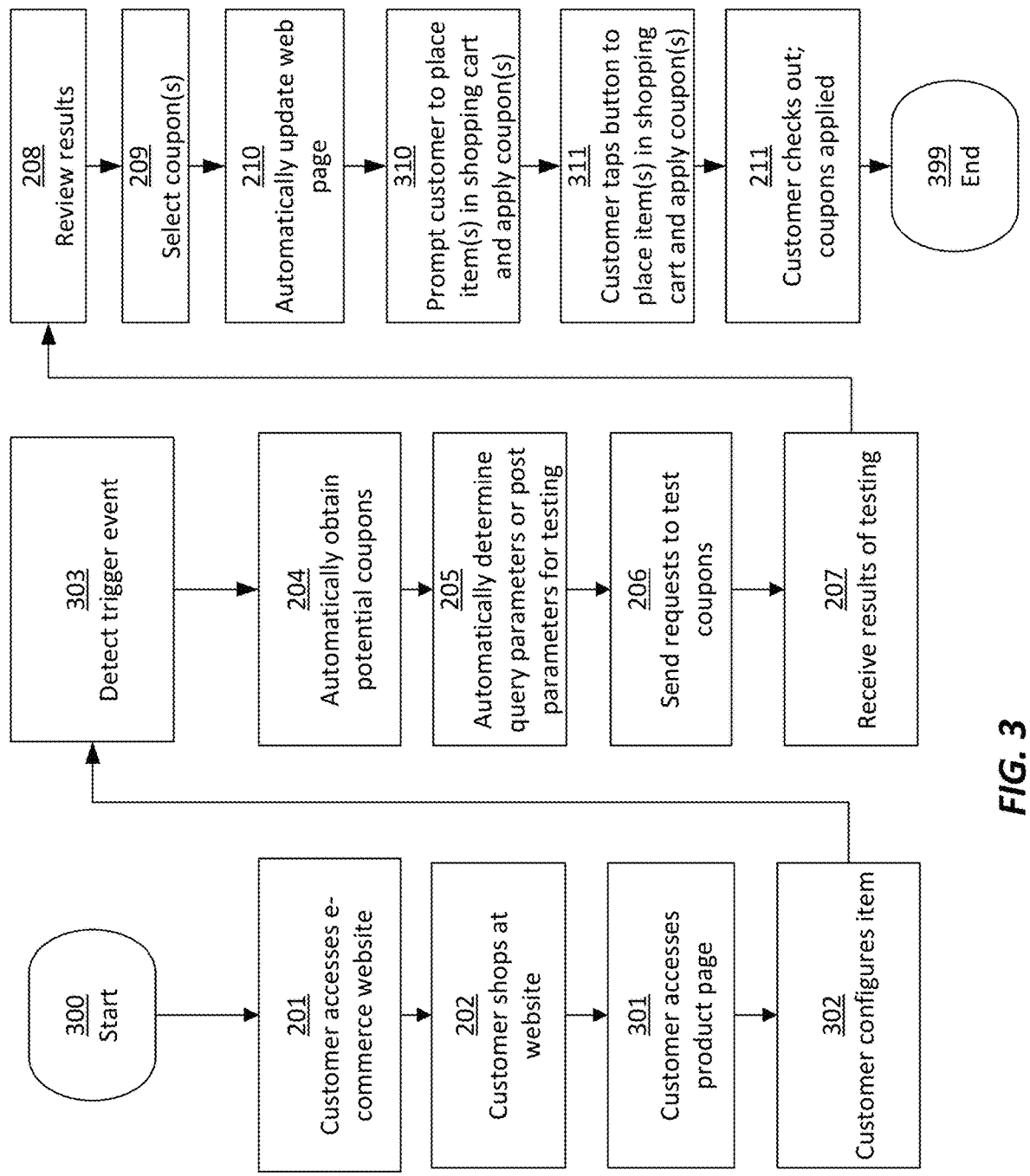
FIG. 3 is a flowchart depicting a method for automated testing of multiple on-line coupons while a customer is browsing a product page, according to one embodiment.

Referring now to FIG. 3, there is shown a flowchart depicting a method for automated testing of multiple on-line coupons while customer 101 is browsing a product page, according to one embodiment. Again, although described herein in terms of tangible goods, the system and method can be implemented for any type of online purchases, including for example services, travel, event tickets, media and entertainment content, and/or the like.

In at least one embodiment, the method depicted in FIG. 3 can be performed using the architecture depicted in FIG. 1. However, one skilled in the art will recognize that the method can be performed using other architectures and arrangements.

In at least one embodiment, the described method is performed in connection with e-commerce shopping.

The method begins 300. Customer 101 accesses 201 an e-commerce website 109, for example via browser 107 or an app running on device 102. Customer 101 shops 202 normally at website 109, and accesses 301 a product page that displays one or more items he or she may be considering buying. If applicable, customer 101 may configure 302 an item on the product page, specifying, for example, a size, color, or other parameter for the item, using known techniques; however, such a step is optional.

A trigger event is detected 303. This trigger event can take any form. For example the system may be configured to initiate coupon testing automatically while customer 101 browses 301 a product page; thus customer 101 need not take any action to activate the method. Accordingly, the trigger event can simply be customer 101 viewing a product page. Alternatively, the trigger event can take another form, such as for example:

customer 101 taking a particular action, such as hitting a button to initiate a search for applicable coupons;
customer 101 remaining on a product page for a predetermined length of time;
customer 101 taking steps to configure a product or item, such as by specifying a size, color, or other parameter;
customer 101 viewing additional details about an item, zooming in on an image of an item, interacting with an item (by, for example, clicking on it, tapping on it, or hovering over it), or otherwise indicating an interest in an item.

Once the trigger event is detected 303, plug-in 108 (or some other component) begins automatically testing for coupons that may be applied to the item(s). Steps 204 through 209 are performed as described above in connection with FIG. 2. In at least one embodiment, the steps are performed for multiple items and/or configurations on the product page sequentially; alternatively, coupon testing for multiple items and/or configurations can be run in parallel with one another.

The web page from website 109 is then automatically updated 210, for example, by performing a refresh or by running a JavaScript command to cause browser 107 to redraw the webpage to indicate any coupon or coupons that worked. In at least one embodiment, customer 101 can be automatically prompted 310 to have the corresponding item(s) automatically placed in customer's 101 shopping cart, if desired, with the selected coupons automatically applied. In at least one embodiment, customer 101 can click or tap a single button 311 to cause the system to automatically add the item(s) to the cart and apply the selected coupon(s); alternatively, customer 101 can manually add the item(s) to the shopping cart. In at least one embodiment, the item(s) is/are automatically added to the shopping art, and the working coupon(s) is/are automatically applied, without customer 101 intervention. Customer 101 can then check out 211 and thereby purchase the item(s), using the applied coupon(s). In at least one embodiment, the working coupon(s) is/are automatically applied and the purchase is automatically completed, without the need for customer 101 to manually check out.

In at least one embodiment, the system operates in a manner that does not require any intervention by customer 101, and does not require that customer 101 know coupon codes, URL's for coupon websites, or any other information about potential coupons. In this manner, the system runs behind the scenes, via plug-in 108 (or other component) and using network requests, so as to automatically seek out and apply valid, working coupons without interfering with customer's 101 behavior, and without interfering with display of the e-commerce web page as coupons are being tested.

In at least one embodiment, as described above, the system can be implemented using client-side plug-in 108. Alternatively, it can be implemented using a browser 107 extension or native functionality of client device 102. Alternatively, it can be implemented server-side, for example by passing customer's 101 cookie to a server and running requests without the use of browser 107.

Figure 7:
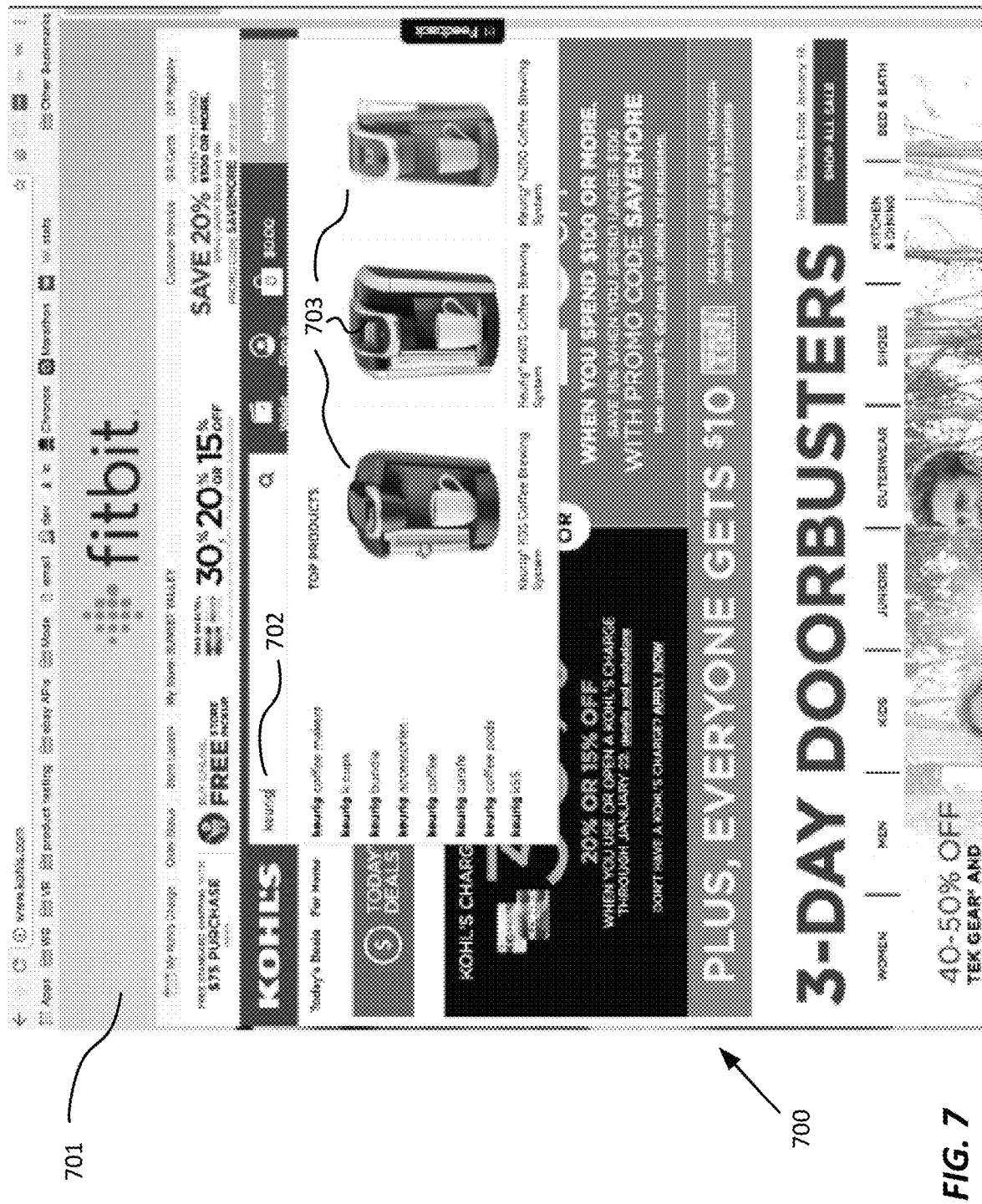
FIGS. 7 through 10 are screen shots depicting examples of a user interface for automated testing of multiple on-line coupons while a customer is browsing a product page, according to one embodiment.

Referring now to FIG. 7, there is shown an example of a screen shot 700 wherein customer 101 is browsing an e-commerce website 701 and has entered a search query 702. Top items 703 matching query 702 are displayed.

Figure 8:

Referring now to FIG. 8, there is shown an example of a screen shot 800 wherein customer 101 has selected (clicked on) one of items 703 displayed in FIG. 1. Customer 101 is presented with details on item 703, such as price 801, specifications 802, available colors 803, and the like, but has not yet placed the item in the shopping cart. Customer 101 has an opportunity to select a desired color 803. At this point, as described above, plug-in 108 automatically tests one or more coupon codes on item 703; such testing takes place behind the scenes, invisible to customer 101. In an alternative embodiment, customer 101 can be notified that coupon testing is taking place, with or without further details on which coupon codes are being tested.

Figure 9:

Referring now to FIG. 9, there is shown an example of a screen shot 900 wherein one or more coupon codes have been tested on displayed item 703, and the system has identified the functioning coupon code that offers the best discount. In at least one embodiment, plug-in 108 presents an indication 901 that a coupon has been found, including a summary 902 of the available discount, and a button 903 to allow customer 101 to automatically add item 703 to the shopping cart and to automatically apply the coupon. In at least one embodiment, if multiple functioning coupons have been found, customer 101 can be prompted to select one of them, or a selection can automatically be made based on the coupon that provides the largest discount.

Figure 10:

Referring now to FIG. 10, there is shown an example of a screen shot 1000 after customer 101 has clicked on button 903 to add item 703 to shopping cart 100 and automatically apply the coupon. Item 703 is now in customer's 101 shopping cart 100, and the coupon discount has been applied, as shown in pricing summary 1002. Customer 101 can now check out normally.

The Figures depict examples only; in other embodiments, other layouts and displays can be used.

Advantages

The described system provides several advantages over existing systems. For example:

The described system runs significantly faster.

The described system runs behind the scenes, so that it is invisible to the customer.

The described system is more reliable, in particular on web pages that change frequently.

The described system is cross-platform. With minor modifications, the same scripts can be used for both mobile and desktop environments. By contrast, existing browser plus selector approaches require a new script to be developed for each platform.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in at least one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for automatically testing and applying on-line coupons, comprising:
   receiving, by one or more processors from a user input device associated with a user, user input associated with an item offered by an on-line merchant;
   detecting that the user input includes a specification of a configuration of the item;
   determining, based on detecting that the user input includes the specification of the configuration of the item, user interest in the item; and
   in response to determining the user interest in the item based on detecting that the user input includes the specification of the configuration of the item:
      automatically identifying, by the one or more processors, a plurality of potential on-line coupons for the item;
      automatically testing, by the one or more processors, the plurality of potential on-line coupons; and
      based on the testing, automatically selecting, by the one or more processors, at least one on-line coupon for applicability to the item, wherein the automatically selecting of the at least one on-line coupon for applicability to the item includes automatically selecting the at least one on-line coupon based on a comparison of magnitudes of discounts offered by the plurality of potential on-line coupons.

2. The computer-implemented method of claim 1, further comprising causing display of an indication of the selected at least one on-line coupon at a display device.

3. The computer-implemented method of claim 1, further comprising automatically applying the selected at least one on-line coupon.

4. The computer-implemented method of claim 1, further comprising:
   automatically placing the item in an e-commerce shopping cart; and
   automatically applying the selected at least one on-line coupon.

5. The computer-implemented method of claim 1, further comprising automatically completing a purchase of the item, with the selected at least one on-line coupon automatically applied.

6. The computer-implemented method of claim 1, wherein the automatically testing the plurality of potential on-line coupons further includes automatically testing the plurality of potential on-line coupons for applicability to the selected item.

7. The computer-implemented method of claim 1, wherein the determining of the user interest in the item is further based on detecting that the user input further includes placing the item in an e-commerce shopping cart.

8. The computer-implemented method of claim 7, wherein, after the item has been placed in the e-commerce shopping cart, the e-commerce shopping cart contains a plurality of items, and wherein:
   the automatically identifying the plurality of potential on-line coupons includes automatically identifying the plurality of potential on-line coupons for the plurality of items in the e-commerce shopping cart; and
   the automatically testing the plurality of potential on-line coupons includes automatically testing the plurality of potential on-line coupons on the plurality of items in the e-commerce shopping cart.

9. The computer-implemented method of claim 7, wherein the e-commerce shopping cart comprises a universal e-commerce shopping cart.

10. The computer-implemented method of claim 1, wherein:
   the user input is received at a client of a client/server system; and
   the automatically identifying the plurality of potential on-line coupons for the item, the automatically testing the plurality of potential on-line coupons, and the automatically selecting the at least one on-line coupon for applicability to the item are performed at a server of the client/server system.

11. A computer program product for automatically testing and applying on-line coupons, comprising:
   a non-transitory computer-readable storage medium; and
   computer program code, encoded on the non-transitory computer-readable storage medium, configured to cause one or more processors to perform the operations of:
      receiving, from a user input device associated with a user, user input associated with an item offered by an on-line merchant;
      detecting that the user input includes a specification of a configuration of the item;
      determining, based on detecting that the user input includes the specification of the configuration of the item, user interest in the item; and
      in response to determining the user interest in the item based on detecting that the user input includes the specification of the configuration of the item:
         automatically identifying a plurality of potential on-line coupons for the item;
         automatically testing the plurality of potential on-line coupons; and based on the testing, automatically selecting at least one on-line coupon for applicability to the item, wherein the automatically selecting of the at least one on-line coupon for applicability to the item includes automatically selecting the at least one on-line coupon based on a comparison of magnitudes of discounts offered by the plurality of potential on-line coupons.

12. The computer program product of claim 11, further comprising computer program code, encoded on the non-transitory computer-readable storage medium, configured to cause the one or more processors to perform the operation of causing a display device to display an indication of the selected at least one on-line coupon.

13. The computer program product of claim 11, further comprising computer program code, encoded on the non-transitory computer-readable storage medium, configured to cause the one or more processors to perform the operation of automatically applying the selected at least one on-line coupon.

14. The computer program product of claim 11, further comprising computer program code, encoded on the non-transitory computer-readable storage medium, configured to cause the one or more processors to perform the operation of:
automatically placing the item in an e-commerce shopping cart; and
automatically applying the selected at least one on-line coupon.

15. The computer program product of claim 11, further comprising computer program code, encoded on the non-transitory computer-readable storage medium, configured to cause the one or more processors to perform the operation of automatically completing a purchase of the item, with the selected at least one on-line coupon automatically applied.

16. The computer program product of claim 11, wherein the automatically testing the plurality of potential on-line coupons includes automatically testing the plurality of potential on-line coupons for applicability to the selected item.

17. The computer program product of claim 11, wherein the determining of the user interest in the item is further based on detecting that the user input further includes placing the item in an e-commerce shopping cart.

18. The computer program product of claim 17, wherein, after the item has been placed in the e-commerce shopping cart, the e-commerce shopping cart contains a plurality of items, and wherein:
the automatically identifying the plurality of potential on-line coupons includes automatically identifying the plurality of potential on-line coupons for the plurality of items in the e-commerce shopping cart; and
the automatically testing the plurality of potential on-line coupons includes automatically testing the plurality of potential on-line coupons on the plurality of items in the e-commerce shopping cart.

19. The computer program product of claim 17, wherein the e-commerce shopping cart comprises a universal e-commerce shopping cart.

20. The computer program product of claim 11, wherein:
the user input is received at a client of a client/server system; and
the automatically identifying the plurality of potential on-line coupons for the item, automatically testing the plurality of potential on-line coupons, and the automatically selecting the at least one on-line coupon for applicability to the item are performed at a server of the client/server system.

21. A system for automatically testing and applying on-line coupons, comprising:
one or more memories storing instructions; and
one or more processors executing the instructions to perform a process including:
receiving, from a user input device, user input associated with an item offered by an on-line merchant;
detecting that the user input includes a specification of a configuration of the item;
determining, based on detecting that the user input includes the specification of the configuration of the item, user interest in the item; and
in response to determining the user interest in the item based on detecting that the user input includes the specification of the configuration of the item:
automatically identifying a plurality of potential on-line coupons for the item;
automatically testing the plurality of potential on-line coupons, by:
determining at least one of a query parameter or a post parameter for each of the plurality of potential on-line coupons;
generating a network request that includes a coupon parameter; and
for each of the plurality of potential on-line coupons:
generating a respective network request by swapping the coupon parameter of the network request with the determined at least one of the query parameter or the post parameter; and
transmitting a respective network request to the on-line merchant; and
receiving a respective indicator of validity for each of the plurality of potential on-line coupons from the on-line merchant; and
based on the testing, automatically selecting at least one on-line coupon for applicability to the item.

22. The system of claim 21, further comprising a display device, communicatively coupled to the one or more processors, wherein the process further includes causing the display device to display an indication of the selected at least one on-line coupon.

23. The system of claim 21, wherein the process further includes: automatically applying the selected at least one on-line coupon.

24. The system of claim 21, wherein the process further includes:
automatically placing the item in an e-commerce shopping cart; and
automatically applying the selected at least one on-line coupon.

25. The system of claim 21, wherein the process further includes: automatically completing a purchase of the item, with the selected at least one on-line coupon automatically applied.

26. The system of claim 21, wherein the automatically testing the plurality of potential on-line coupons includes automatically testing the plurality of potential on-line coupons for applicability to the selected item.

27. The system of claim 21, wherein the automatically selecting the at least one on-line coupon for applicability to the item includes automatically selecting the at least one on-line coupon based on a comparison of magnitudes of discounts offered by the plurality of potential on-line coupons.

28. The system of claim 21, wherein the determining of the user interest in the item is further based on detecting that the user input includes placing the item in an e-commerce shopping cart.

29. The system of claim 28, wherein, after the item has been placed in the e-commerce shopping cart, the e-commerce shopping cart contains a plurality of items, and wherein:
   the automatically identifying the plurality of potential on-line coupons includes automatically identifying the plurality of potential on-line coupons for the plurality of items in the e-commerce shopping cart; and
   the automatically testing the plurality of potential on-line coupons includes automatically testing the plurality of potential on-line coupons on the plurality of items in the e-commerce shopping cart.

30. The system of claim 28, wherein the e-commerce shopping cart comprises a universal e-commerce shopping cart.

31. The system of claim 21, wherein:
   the user input is received at a client of a client/server system; and
   the automatically identifying the plurality of potential on-line coupons for the item, the automatically testing the plurality of potential on-line coupons, and the automatically selecting the at least one on-line coupon for applicability to the item are performed at a server of the client/server system.

32. The computer-implemented method of claim 1, further comprising:
   automatically updating a product page for the item based on the selected at least one on-line coupon.

33. The method of claim 1, wherein automatically testing the plurality of potential on-line coupons includes:
   determining at least one of a query parameter or a post parameter for each of the plurality of potential on-line coupons;
   generating a network request that includes a coupon parameter; and
   for each of the plurality of potential on-line coupons:
      generating a respective network request by swapping the coupon parameter of the network request with the determined at least one of the query parameter or the post parameter; and
      transmitting a respective network request to the on-line merchant; and
      receiving a respective indicator of validity for each of the plurality of potential on-line coupons from the on-line merchant.

34. The computer program product of claim 11, wherein automatically testing the plurality of potential on-line coupons includes:
   determining at least one of a query parameter or a post parameter for each of the plurality of potential on-line coupons;
   generating a network request that includes a coupon parameter; and
   for each of the plurality of potential on-line coupons:
      generating a respective network request by swapping the coupon parameter of the network request with the determined at least one of the query parameter or the post parameter; and
      transmitting a respective network request to the on-line merchant; and
      receiving a respective indicator of validity for each of the plurality of potential on-line coupons from the on-line merchant.

35. The method of claim 1, wherein the method is performed by a plug-in operating in a background of a web browser of a user device associated with the user.

36. The method of claim 1, wherein automatically identifying the plurality of potential on-line coupons for the item includes:
   accessing coupon information from one or more web page or web-based resource;
   identifying, from the coupon information, a set of on-line coupons applicable to the online merchant; and
   selecting, from the identified set of on-line coupons, the plurality of potential on-line coupons.

37. The method of claim 36, wherein selecting the plurality of potential on-line coupons is based on a criteria including one or more of information associated with the item, a last instance that the set of coupons were successfully applied, a success rate of the set of coupons, or a number of attempts for applying the set of coupons.

38. The method of claim 37, wherein the criteria is associated with a scoring algorithm.

39. The method of claim 38, wherein:
   the scoring algorithm is indicative of whether each of the set of coupons is predicted to work; and
   the selecting of the plurality of potential on-line coupons is further based on whether each of the set of on-line coupons has a score from the scoring algorithm above a predetermined threshold.

\* \* \* \* \*